(12) United States Patent
Makaran

(10) Patent No.: US 6,611,410 B1
(45) Date of Patent: Aug. 26, 2003

(54) POSITIVE SUPPLY LEAD REVERSE POLARITY PROTECTION CIRCUIT

(75) Inventor: John E. Makaran, London (CA)

(73) Assignee: Siemens VDO Automotive Inc., Chatham (CA)

( * ) Notice: Subject to any disclaimer, the term of this patent is extended or adjusted under 35 U.S.C. 154(b) by 220 days.

(21) Appl. No.: 09/639,787

(22) Filed: Aug. 16, 2000

Related U.S. Application Data

(60) Provisional application No. 60/172,320, filed on Dec. 17, 1999.

(51) Int. Cl.[7] .................................................. H02H 3/18
(52) U.S. Cl. ............................ 361/84; 361/23; 307/127
(58) Field of Search ........................ 361/84, 91.8, 365, 361/13, 23; 307/127

(56) References Cited

U.S. PATENT DOCUMENTS

| | | |
|---|---|---|
| 3,571,608 A | 3/1971 | Hurd |
| 3,659,182 A | 4/1972 | Snedeker |
| 3,928,775 A | 12/1975 | Steigerwald |
| 3,940,633 A | 2/1976 | Steigerwald |
| 3,940,785 A | 2/1976 | Genesi |
| 4,231,083 A | 10/1980 | Matsuda et al. |
| 4,303,958 A | 12/1981 | Allgood |
| 4,365,171 A | 12/1982 | Archer |
| 4,392,172 A | 7/1983 | Foley et al. |
| 4,423,456 A | 12/1983 | Zaidenweber |
| 4,607,322 A | 8/1986 | Henderson |
| 4,611,267 A | 9/1986 | McMurray |
| 4,679,112 A | 7/1987 | Craig |
| 4,689,711 A | 8/1987 | Conzelmann et al. |
| 4,697,219 A | 9/1987 | Mitsuoka |
| 4,760,324 A | 7/1988 | Underhill |
| 4,772,810 A | 9/1988 | Felps |
| 4,857,985 A | 8/1989 | Miller |
| 4,922,401 A | 5/1990 | Lipman |
| 4,945,444 A | 7/1990 | Schwertlein et al. |
| 4,958,251 A | 9/1990 | Cini et al. |
| 5,012,381 A | 4/1991 | Elliott et al. |
| 5,014,180 A | 5/1991 | Nuechterlein |
| 5,027,250 A | 6/1991 | Cini et al. |

(List continued on next page.)

OTHER PUBLICATIONS

Electronic Circuits: Analysis, Simulation and Design first edition p. 307.*

"Modern Dictionary of Electronics", 9th edition.*

International Search Report Application No. PCT/EP97/00923, Publication No. WO 97/32390 dated Sep. 4, 1997.

*Primary Examiner*—Brian Sircus
*Assistant Examiner*—Isabel Rodriguez

(57) ABSTRACT

A protection circuit for use in a power electronic circuit has a positive supply input, a negative supply input, and a snubber. The protection circuit includes a snubber bias lead, a positive voltage lead, a positive supply lead, a switch and a reverse polarity shut off circuit. The snubber bias lead is adapted to be coupled to obtain a bias voltage from the snubber of the power electronic circuit, the positive voltage lead is adapted to be coupled to a positive voltage lead of a power supply, and the positive supply lead is adapted to be coupled to the positive supply input of the power electronic circuit. The switch has a control input coupled to the snubber bias lead, a first terminal coupled to the positive voltage lead, and a second terminal coupled to the positive supply lead. The switch is operable to selectively allow current flow from the second terminal to the first terminal based at least in part on the bias voltage at said control input. The reverse polarity shut off circuit is coupled to the negative supply input and the control input, the reverse polarity shut off circuit operable cause the switch to inhibit current flow from the second terminal to the first terminal when a positive supply voltage is detected at the negative supply input.

31 Claims, 3 Drawing Sheets

U.S. PATENT DOCUMENTS

| | | |
|---|---|---|
| 5,055,991 A | 10/1991 | Carroll et al. |
| 5,126,911 A | 6/1992 | Contiero et al. |
| 5,223,779 A | 6/1993 | Palaniappan |
| 5,260,607 A * | 11/1993 | Kinbara ............... 327/427 |
| 5,410,441 A | 4/1995 | Allman |
| 5,416,361 A | 5/1995 | John et al. |
| 5,424,937 A | 6/1995 | Iyotani et al. |
| 5,434,739 A | 7/1995 | Heck |
| 5,444,594 A | 8/1995 | Tanaka et al. |
| 5,483,192 A | 1/1996 | Tai |
| 5,517,379 A | 5/1996 | Williams et al. |
| 5,519,557 A | 5/1996 | Kopera, Jr. et al. |
| 5,535,085 A | 7/1996 | Tanaka et al. |
| 5,539,610 A | 7/1996 | Williams et al. |
| 5,548,503 A | 8/1996 | Motonobu et al. |
| 5,579,215 A | 11/1996 | Turuta |
| 5,615,094 A | 3/1997 | Cosentino et al. |
| 5,642,251 A | 6/1997 | Lebbolo et al. |
| 5,689,409 A | 11/1997 | Scharlach et al. |
| 5,726,505 A | 3/1998 | Yamada et al. |
| 5,757,600 A | 5/1998 | Kiraly |
| 5,764,465 A | 6/1998 | Mattes et al. |
| 5,781,390 A | 7/1998 | Notaro et al. |
| 5,796,599 A | 8/1998 | Raonic et al. |
| 5,864,475 A | 1/1999 | Ikawa et al. |
| 5,880,943 A | 3/1999 | Yokoyama |

* cited by examiner

POSITIVE SUPPLY LEAD REVERSE POLARITY PROTECTION CIRCUIT

This application claims the benefit of U.S. Provisional Patent Application No. 60/172,320, filed Dec. 17, 1999.

FIELD OF THE INVENTION

The present invention relates generally to power electronic circuits, and more particularly to power electronic circuits that include snubbers.

BACKGROUND OF THE INVENTION

Power electronic circuits are, in generalized terms, circuits that use electronic components to perform operations in the field of power conversion. One subset of power electronic circuits operate using an DC power source. This subset includes DC motors and DC-DC or DC-AC converters. DC motors include both brush-type motors and brushless motors. Such devices experience widespread use. DC-DC converters include boost and buck type converters, which are also in widespread use.

The power electronic circuits that operate using a DC power source are often employed in vehicular applications and portable applications. For example, DC brushless motors are often used in radiator fans in automobiles and trucks. The DC power source in such application is the vehicle battery.

One potential issue with DC-powered circuits, including DC power electronic circuits, relates to the behavior of such circuits when the polarity of the DC power source is inadvertently reversed. In particular, DC power sources, for example, batteries, are often replaced by consumers and/or mechanics having modest electrical training. As a result, batteries are occasionally installed incorrectly, and more specifically, such that they are connected in reverse polarity. Because the possibility of the reverse polarity of the DC power source exists, it is desirable to protect the components of the power electronic circuit from damage or destruction upon occurrence of an accidental reverse wiring of the DC power source.

To this end, power electronic circuits may include a reverse polarity protection arrangement. The reverse polarity protection arrangement substantially limits reverse polarity DC current from flowing through portions of the power electronic circuit that could otherwise be damaged by such reverse polarity current.

One design of a reverse polarity protection arrangement consists of a MOSFET switch coupled in series between the DC power source and the power electronic circuit. For example, U.S. Pat. No. 4,857,985 to Miller and U.S. Pat. No. 5,757,600 to Kiraly show reverse polarity protection arrangements in which the negative terminal (ground) connections of an electronic circuit are connected to the negative terminal of the battery source through the source-drain junctions of a MOSFET switch. The circuits are arranged such that as long as the battery is properly connected, the gate voltage of the MOSFET switch is high enough to turn the switch on (i.e. allow the switch to conduct drain to source). However, if the battery is connected such that it is in reverse polarity, the gate voltage cannot provide a sufficient turn on voltage. As a result, the reverse polarity energy cannot reach the electronic circuit.

One problem associated with the reverse polarity protection arrangements of U.S. Pat. Nos. 4,857,985 and 5,757,600 arises from the location of the MOSFET in the return or ground path. Location of the MOSFET in the return or ground path introduces a stray inductance into the return/ground path, which is undesirable with respect to suppressing electromagnetic radiation.

A solution that does not introduce a stray inductance into the return path of the electronic circuit is provided in U.S. Pat. No. 5,642,251 to Kopera, Jr. et al and U.S. Pat. No. 5,517,379 to Williams et al. Those patents employ reverse polarity protection arrangements in which a MOSFET switch is series connected source to drain between the positive supply lead of the DC power source and the positive supply terminal of the electronic circuit. The arrangements, similar to those described above, generate a gate voltage sufficient to allow current to flow source to drain (and thus through the electronic circuit) only when the DC power supply is properly connected. One problem with the solutions of U.S. Pat. Nos. 5,642,251 and 5,517,379 is that they require a gate voltage that is higher than the DC power source voltage in order to turn on the MOSFET switch. To this end, a charge pump circuit or the like must be employed to generate the gate voltage. Although the charge pump circuit generates sufficient voltage to turn on the MOSFET, the charge pump circuit is a direct drain on the DC power source and also requires significant amounts of space and power consuming circuitry.

What is needed therefore, is a reverse polarity protection arrangement that avoids shortcomings of the prior art. In particular, there is a need for a reverse polarity protection arrangement that does not introduce a stray inductance into the ground path of the circuit while avoiding excessive power consumption as is required to operate a special charge pump circuit.

SUMMARY OF THE INVENTION

The present invention fulfills the above needs, as well as others, by providing a reverse polarity protection arrangement that includes a protection switch coupled in the positive voltage supply line that is configured to be powered by a snubber circuit of a power electronic circuit. Snubber circuits in power electronic circuit topologies are circuits that absorb surge voltages that occur when an inductive element in the power electronic circuit is suddenly turned off. The snubber circuit stores the surge voltage, which is in excess of the supply voltage. In accordance with the present invention, the snubber circuit voltage is used to bias the protection switch when the DC power source is properly connected. Exemplary power electronic circuits that include such snubber circuits include DC brushless motor control circuits and boost-type DC-DC switching power converters.

An exemplary embodiment of the present invention is a protection circuit for use in a power electronic circuit having a positive supply input, a negative supply input, and a snubber. The protection circuit includes a snubber bias lead, a positive voltage lead, a positive supply lead, a switch and a reverse polarity shut off circuit. The snubber bias lead is adapted to be coupled to obtain a bias voltage from the snubber of the power electronic circuit, the positive voltage lead is adapted to be coupled to a positive voltage lead of a power supply, and the positive supply lead is adapted to be coupled to the positive supply input of the power electronic circuit. The switch has a control input coupled to the snubber bias lead, a first terminal coupled to the positive voltage lead, and a second terminal coupled to the positive supply lead. The switch is operable to selectively allow current flow from the second terminal to the first terminal based at least in part on the bias voltage at said control input. The reverse polarity shut off circuit is coupled to the negative supply input and the control input, the reverse polarity shut off circuit operable cause the switch to inhibit current flow from the second terminal to the first terminal when a positive supply voltage is detected at the negative supply input.

In the embodiments described herein, a current limiting device may furthermore be coupled between the snubber bias lead and the control input of the switch. The current limiting device does not affect normal operation, but ensures that a low impedance, high current path is not provided through the snubber in a reverse polarity situation. The current limiting device may suitably be a resistance that substantially exceeds the normal impedance of the coil circuits.

The present invention thus provides a method and apparatus of protecting a power electronic circuit from excessive reverse polarity current when a DC power source is connected to the electronic circuit in reverse polarity without introducing a stray inductance into the negative supply line (i.e. ground) and without consuming power directly from the DC power source.

The above described features and advantages, as well as others, will become more readily apparent to those of ordinary skill in the art by reference to the following detailed description and accompanying drawings.

DETAILED DESCRIPTION

Figure 1:
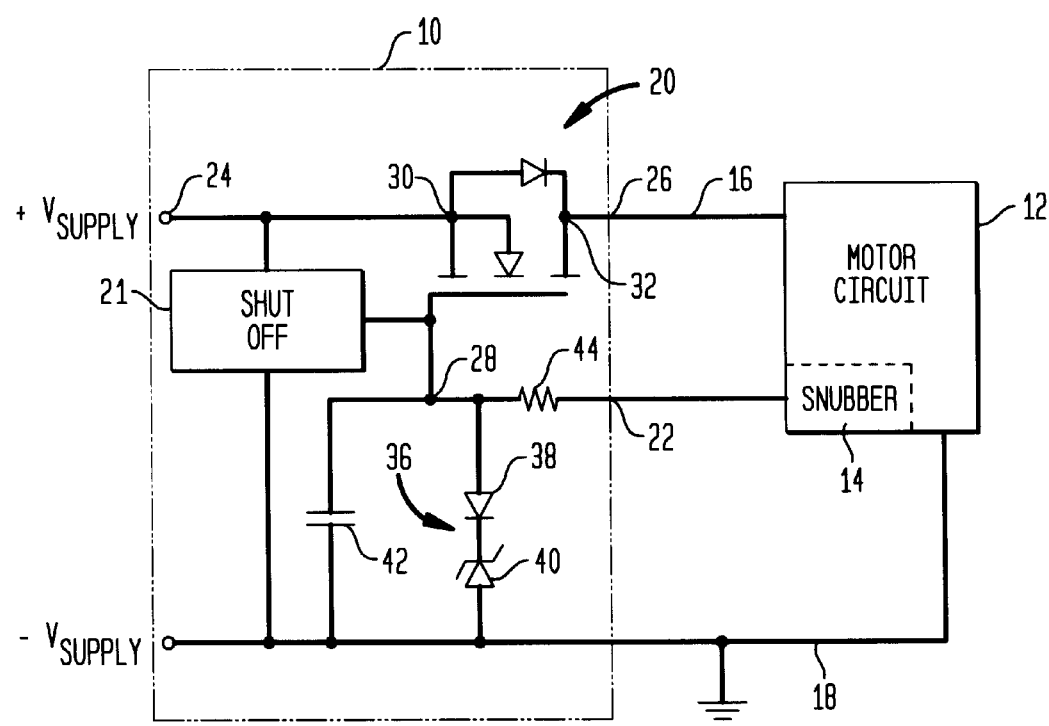
FIG. 1 shows a block diagram schematic diagram of an exemplary embodiment of a protection circuit in accordance with the present invention used in connection with a power electronic circuit that includes a snubber.

FIG. 1 shows an exemplary embodiment of a protection circuit 10 implemented in connection with a power electronic circuit 12 that includes a snubber 14. The power electronic circuit 12 further includes a positive supply input 16 and a negative supply input 18. In the exemplary embodiment described herein, the power electronic circuit 12 is a motor control circuit. However, it will be appreciated that the power electronic circuit 12 may alternatively be a boost-type DC-DC converter or other circuit that includes a snubber for receiving surge voltage that is produced as a result of operating a switch in series with an inductive coil. In any event, the power electronic circuit 12 may suitably be an N-phase brushless DC motor control circuit. Exemplary embodiments of the power electronic circuit 12 and the snubber 14 are discussed below in connection with FIGS. 2 and 3.

The protection circuit 10 in the exemplary embodiment described herein includes a switch 20, a snubber bias lead 22 adapted to be coupled to obtain a bias voltage from the snubber 14, a positive voltage lead 24 adapted to be normally coupled to a positive connection of a power supply, not shown, and a positive supply lead 26 adapted to be coupled to the positive supply input 16 of the power electronic circuit 12. The protection circuit 10 further comprises a reverse polarity shut off circuit 21 that is coupled to the switch 20 and the negative supply input 18. The negative supply input 18 is adapted to connect to a negative voltage lead of the DC power source, and is also referred to herein as ground.

The switch 20 has a control input 28, a first terminal 30, and a second terminal 32. The control input 28 is operably coupled to the snubber bias lead 22 to receive the bias voltage therefrom. The first terminal 30 is coupled to the positive voltage lead 24, and the second terminal 32 is coupled to the positive supply lead 26. The switch 20 is operable to selectively allow current flow from the second terminal 32 to the first terminal 30 based at least in part on the bias voltage at said control input 28, and to alternatively inhibit current flow from the second terminal 32 to the first terminal 30. As will be discussed below the ability to inhibit current flow from the second terminal 32 to the first terminal 30 protects the power electronic circuit 12 from large reverse polarity currents. Additionally, the ability to allow current flow from the second terminal 32 to the first terminal 30 allows proper operation of the power electronic circuit 30 when the DC power supply is properly connected.

In the exemplary embodiment described herein, the switch 20 is a metal oxide semiconductor field effect transistor ("MOSFET"). In particular, the switch 20 is an n-channel enhancement-type MOSFET. Accordingly, in this embodiment, the control input 28 is the MOSFET gate, the first terminal 30 is the MOSFET source, and the second terminal 32 is the MOSFET drain. As is known in the art, the MOSFET switch 20 further includes an inherent diode, referred to herein as the switch diode 34 coupled between the source (first terminal 30) and the drain (second terminal 32). The switch diode 34 is forward biased from the first terminal 30 to the second terminal 32.

The reverse polarity shut off circuit 21 is a circuit that is operable to cause the switch 20 to inhibit current flow from its second terminal 32 to its first terminal 30 when a positive supply voltage is detected at the negative supply input 18. In other words, the reverse polarity shut off circuit 21 is operable to inhibit current flow through the switch 20 when a DC power supply, not shown, is connected in reverse polarity to the positive voltage lead 24 and the negative supply input 18. Exemplary embodiments of the reverse polarity shut off circuit 21 are described below in connection with FIGS. 2 and 3.

The protection circuit 10 preferably further comprises a current limiting device 44, which may suitably be a resistor in the embodiment described herein. The current limiting device 44 is chosen to have an impedance greatly exceeding the impedance of the DC impedance of the power electronic circuit 12 measured from the negative supply input 18 to the positive supply input 16. For example, the current limiting device 44 may suitably have a resistance value an order of magnitude and preferably at least two orders of magnitude greater than the power electronic circuit 12. As will be discussed below, the current limiting device 44 limits the reverse polarity current that flows through the snubber 14 and the snubber bias lead 22 in a reverse polarity situation.

In the exemplary embodiment described herein, the protection circuit 10 further includes a voltage clamp 36 coupled between the snubber bias lead 22 and the negative supply input 18. The voltage clamp 36 is configured as is known in the art to prevent the voltage at the control input 28 from exceeding a level at which the switch 20 may be damaged. For example, if the switch 20 is implemented as a MOSFET, then the voltage clamp 36 would be configured to limit the voltage level at the control input 28 such that the voltage drop from gate to source (or gate to drain) does not exceed the specifications of the MOSFET. The voltage clamp 36 may, for example, include a diode 38 and a Zener diode 40. In such a case, as illustrated in FIG. 1, the diode 38 is forward biased to conduct between the snubber bias lead 22 and the Zener diode 40, the zener diode 40 is coupled to the negative supply input 18, and the zener diode 40 is reverse biased with respect to the diode 38.

Moreover, the protection circuit 10 further includes a charge storage device 42, which may suitably be a capacitor, coupled between the snubber bias lead 22 and the negative supply input 16. In the exemplary embodiment described herein, the charge storage device 42 may suitably be coupled to the snubber bias lead 22 through the current limiting device 44.

In general, the protection circuit 10 allows current to flow through the power electronic circuit 12 when a DC power source, not shown, such as a battery, is properly connected across the positive voltage lead 24 and the negative supply input 18. The DC power source is properly connected when the positive lead of the power source is coupled to the positive voltage lead 24, and the negative lead of the power source is connected to the negative supply input 18. In accordance with the present invention, the protection circuit 10 substantially limits the current flow through the power electronic circuit 12 when the DC power source is reverse-polarity connected, or in other words, when the positive lead of the DC power source is connected to the negative supply input 18 and the negative lead of the DC power source is connected to the positive voltage lead 24. Connection in reverse polarity may occur, for example, when the power leads of an automobile are connected to the wrong terminals of the automotive battery.

In particular, the protection circuit 10 operates as described below when the DC power source is properly connected (i.e. in normal polarity) to the positive voltage lead 24 and the negative supply input 18. As an initial matter, the switch 20 is turned off. Upon connection of the DC power source, however, current flows through the switch diode 34 to the power electronic circuit 12. The current flowing through the power electronic circuit 12 causes the power electronic circuit 12 to begin to operate. As a result of such operation, the snubber 14 begins to store excess voltage generated within the power electronic circuit 12 as is well known in the art.

It is noted that although the power electronic circuit 12 can operate from current passed through the switch diode 34, permanent operation using current provided through the switch diode 34 is undesirable for two reasons. First, the use of a diode such as the switch diode 34 results in relatively significant power losses associated with the forward diode voltage drop. Second, in certain embodiments including brushless motor embodiment, it is desirable to allow current flow in the reverse direction toward the DC power source to reduce back emf, which would not be possible if the switch diode 34 were the only circuit connection between the positive voltage lead 24 and the positive supply input 16. Accordingly, as described below, the voltage developed by the snubber 14 helps turn on the switch 20 to bypass the switch diode 34 during ongoing operation of the power electronic circuit 12.

In particular, the excess voltage generated by the snubber 14, i.e. the bias voltage, propagates to the control input 28 via the snubber bias lead 22. Because the bias voltage exceeds the DC supply voltage at the positive voltage lead 24, the bias voltage eventually reaches a level sufficient to cause the control input 28 to turn "on" the switch 20. When the switch 20 is turned on, current flows directly from the first terminal 30 to the second terminal 32 without a diode voltage drop. As a result, energy from the DC voltage source is provided directly through the power electronic circuit 12 instead of through the switch diode 34. In addition, current may also flow from the second terminal 32 to the first terminal 30 as is necessary to reduce back emf in the power electronic circuit 12.

In practical application, the bias voltage generated by the snubber 14 may fluctuate somewhat. In cases in which the bias voltage drops momentarily, the charge storage device 24 operates to maintain the voltage at the control input 28. Contrariwise, in cases in which the bias voltage surges excessively high (i.e. high enough to potentially cause damage to the switch 20), the voltage clamp 36 operates to maintain the control input 28 at a tolerable level.

It is noted that the reverse polarity shut off circuit 21 does not interfere with the operation of the switch 20 because the voltage detected at the negative supply input 16 will not be positive with respect to the voltage at the positive voltage lead 24. Thus, the conditions are not present for the reverse polarity shut off circuit 21 to cause the switch 20 to inhibit current flow from the second terminal 32 to the first terminal 30, Further details regarding the structure and operation of two exemplary embodiments of the reverse polarity shut off circuit 21 are provided below in connection with FIGS. 2 and 3.

The operation of the protection circuit 10 in the event that the DC power source is connected in reverse polarity will now be considered. In such circumstances, the voltage at the negative supply input 18 exceeds the voltage at the positive voltage lead 24 by the voltage level of the DC power source. The switch 20 remains "off" such that it does not conduct current between the second terminal 32 and the first terminal 30. As a result, there is no path between the negative supply input 18 and the positive supply input 16 through which a circuit may be completed. To the extent that any current path exists during a reverse polarity situation, it is through the snubber bias lead 22 and the reverse polarity shut off circuit 21. However, any current flowing through that current path is substantially limited by the current limiting device 44.

In particular, the reverse polarity shut off circuit 21, responsive to the positive voltage at the negative supply input 18, causes the switch 20 to inhibit current flow from its second terminal 32 to its first terminal 30. To this end, if the switch 20 is an n-channel enhancement mode MOSFET having its source couple to the positive voltage lead 24 and its drain coupled to the positive supply input 16 of the power electronic circuit 12, then the reverse bias shut off circuit 21 may suitably short the control input 28 (gate) to the first terminal 30 (source) of the MOSFET switch 20. As a result, the gate to source voltage would not be sufficient to turn on the MOSFET switch 20, and the MOSFET switch 20 will act as an open circuit from drain to source (second terminal 32 to first terminal 30).

In any event, because the switch 20 inhibits current flow from the second terminal 32 to the first terminal 30, the only path between negative supply input 18 and the positive voltage lead 24 is through the current limiting device 44. Because the current limiting device 44 has a substantially large DC impedance or resistance value, relatively little current flows through the power electronic circuit 12 via the snubber 14. For example, if the current limiting device 44 has a resistance that is two orders of magnitude greater than the DC impedance of the power electronic circuit 12 itself, the reverse polarity current through the power electronic circuit 12 will be on the order of two orders of magnitude less than the current would be without the protection circuit 10.

Accordingly, the present invention provides an arrangement for protecting a power electronic circuit that employs a reverse protection switch in the positive supply bus, thereby eliminating the problems associated with using a switch in the negative supply bus (i.e. the ground line). Moreover, the arrangement of the present invention utilizes surge voltage that is inherently developed at the snubber of a power electronic circuit to provide sufficient bias voltage to hold the reverse protection switch on during normal operation of the power electronic circuit. By using the inherently-developed surge voltage, the present invention eliminates the need for special voltage pump circuits to generate the required control input voltage for the reverse protection switch. Elimination of the need for the voltage pump circuits is advantageous because such circuits can undesirably load the DC power supply circuit.

Figure 2:
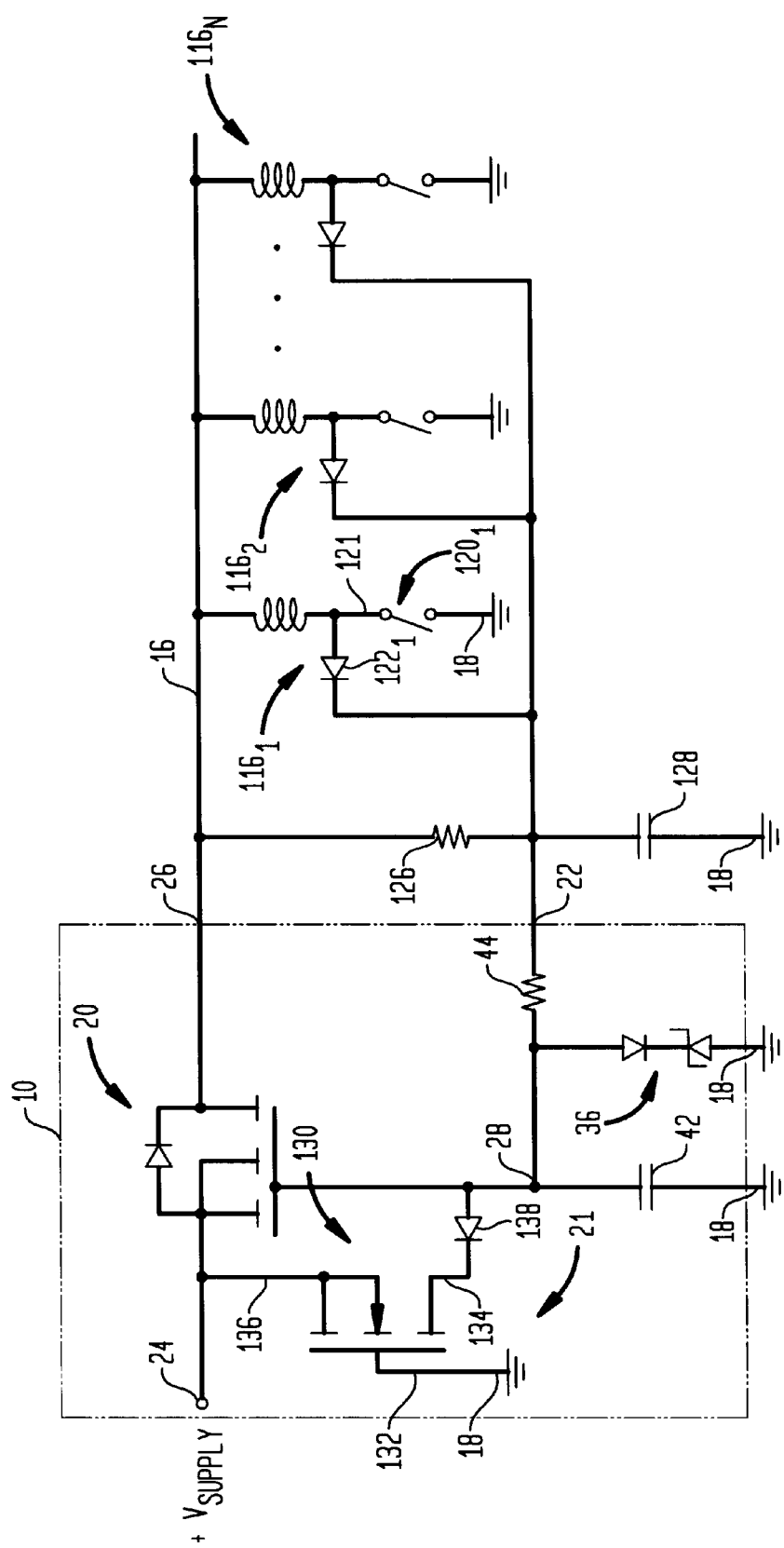
FIG. 2 shows a schematic diagram of an exemplary embodiment of a protection circuit in accordance with the present invention used in connection with a brushless motor control circuit having a first type of snubber.
Figure 3:
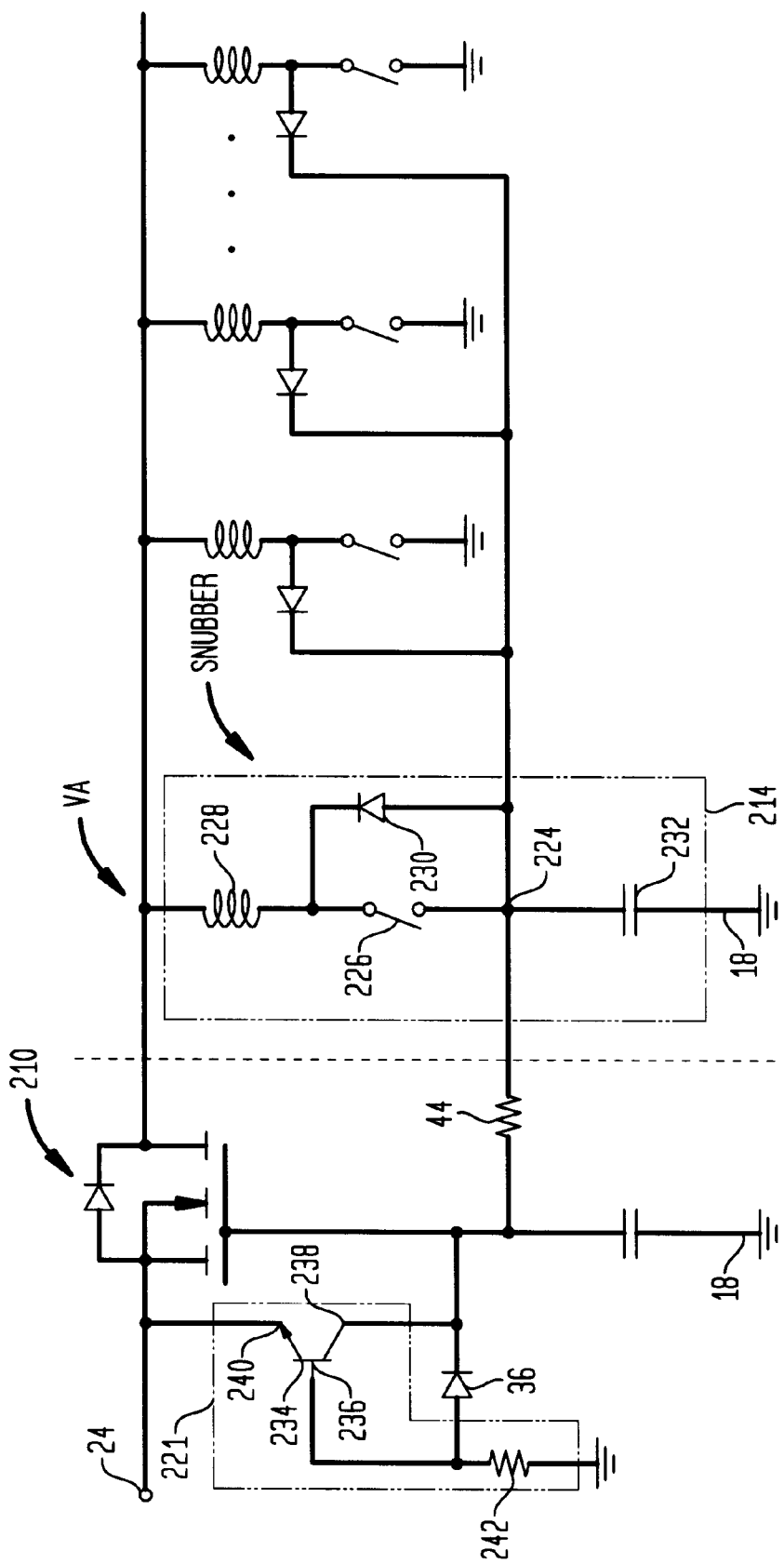
FIG. 3 shows a schematic diagram of an exemplary embodiment of a protection circuit in accordance with the present invention used in connection with a brushless motor control circuit having a second type of snubber.

FIGS. 2 and 3, provided below, show specific exemplary embodiments of power electronic circuits used in connection with an embodiment of the protection circuit according to the present invention. Like reference numbers in FIGS. 1, 2, and 3 will be used for like components.

FIG. 2 shows a power electronic circuit in the form of a motor control circuit 112 used in connection with the protection circuit 10 of FIG. 1. The motor control circuit 112 is a control circuit for a brushless DC motor and includes an exemplary snubber circuit commonly referred to as a RCD snubber 114. The RCD snubber 114 includes a snubber junction 124, an snubber impedance 126 and a snubber capacitor 128. The motor control circuit 112 includes N coil circuits $116_1, 116_2, \ldots, 116_N$. Each of the N coil circuits $116_1, 116_2, \ldots, 116_N$ correspond to one phase of an N-phase motor, as is known in the art.

The first coil circuit $116_1$ includes a stator coil $118_1$, a phase switch $120_1$, and a freewheeling diode $122_1$. The stator coil $118_1$ is coupled on one end to the positive supply input 16 and on the other end to the phase switch $120_1$. The phase switch $120_1$ is furthermore configured to selectively couple the stator coil $118_1$ to the negative supply input 18, which is shown as ground. The control of the phase switch $120_1$ is provided by a phase switch controller circuit, which is not shown. As is well known in the art, the phase switch controller circuit causes the phase switch $120_1$ to alternately connect and disconnect the stator coil $118_1$ to the negative supply input at a rate that is coordinated with the rotational position of the rotor, not shown, to cause the rotor to rotate at a desired speed.

The freewheeling diode $122_1$ is coupled at one end to the junction of the phase switch $120_1$ and the stator coil $118_1$ and at the other end to the snubber junction 124. Each of the other coil circuits $116_2 \ldots 116_N$ is configured in the same manner as the coil circuit $116_1$. As a result, each of the coil circuits $116_X$ includes a stator coil $118_X$, a phase switch $120_X$, and a freewheeling diode $122_X$.

In the snubber circuit 114, the snubber impedance 126, which is typically a resistor, is coupled between the positive supply input 16 and the snubber junction 124. In addition, the snubber capacitor 128 is coupled between the snubber junction 126 and the negative supply lead 18. The snubber junction 126 is coupled to the snubber bias lead 22. The embodiment of the protection circuit 10 shown in FIG. 2 includes a first embodiment of the reverse polarity shut off circuit 21 that includes a MOSFET 130. The MOSFET 130 includes a gate 132 coupled to the negative supply input 18, a drain 134 coupled to the control input 28 through a reverse-biased diode 138, and a source 136 coupled to the positive voltage lead 24.

In normal operation, a DC power source, not shown, is properly connected to the positive voltage lead 24 and the negative supply input 18. As an initial matter, the switch 20 is turned off. Upon connection of the DC power source, however, current flows through the switch diode 34 to the positive supply input 16 of the motor control circuit 112. The current flowing through the positive supply input 16 provides sufficient bias power to allow the N coil circuits $116_1, 116_2, \ldots, 116_N$ to operate in a manner as to start rotation of the motor's rotor, not shown.

In particular, each phase switch $120_X$ alternatively turns on and off to allow drive current to flow through the corresponding phase coil $118_X$ as is known in the art. When, however, the phase switch $120_X$ is turned off (i.e. the phase coil $118_1$ is disconnected from the negative supply input 18), there is a tendency to build up the voltage at the top of the phase switch $120_X$ because of the residual current flowing through phase coil $118_X$. Excessive voltage build-up can damage the phase switch $120_X$, which is typically a power transistor. To avoid damaging the phase switch $120_X$, the residual current flow is bled off through the freewheeling diode $122_X$ into the snubber junction 124.

Each of the other coil circuits $116_1, 116_2 \ldots, 116_N$ operate in the same manner, although their respective phase switches $120_1, 120_2 \ldots, 120_N$ are turned on and off at staggered times determined in part by the rotor position as is well known in the art. The current flow through the freewheeling diodes $122_1, 122_2 \ldots, 122_N$ of the coil circuits $116_1, 116_2, \ldots, 116_N$ raises the voltage level of the snubber junction 124, as is well known in the art. This raised voltage level constitutes the bias voltage that is provided to the snubber bias lead 22.

As discussed above, the bias voltage propagates to the control input 28 from the snubber bias lead 22. The bias voltage eventually reaches a level sufficient to cause the control input 28 to turn "on" the switch 20. When the switch 20 is turned on, current flows directly from the first terminal 30 to the second terminal 32. As a result, energy from the DC voltage source is provided directly through the switch 20 to motor control circuit 112 without flowing through the switch diode 34. Moreover, current may flow from the second terminal 32 to the first terminal 30 as is necessary to reduce back emf in the power electronic circuit 12.

The operation of the protection circuit 10 in the event that the DC power source is connected in reverse polarity will now be considered. In such circumstances, the voltage at the negative supply input 18 exceeds the voltage at the positive voltage lead 24 by the voltage level of the DC power source.

In general, the switch 20 does not turn on and remains in its "off" state. As a result, the switch 20 does not conduct current between the output 32 and the switched input 30. As discussed above in connection with FIG. 1, the switch 20 cannot turn on under such circumstances because the reverse polarity shut off circuit 21 causes the switch 20 to be in the "off" state when it detects a relatively high voltage at the negative supply input 18.

To this end, the positive voltage on the negative supply input 18 appears at the gate 132 of the MOSFET 130, and the negative (i.e. ground) voltage appears at the source 136 of the MOSFET 130. As a result, the gate to source voltage is sufficient to turn the MOSFET 130 on, thereby effectively coupling the control input 28 to the positive voltage lead 24 through the diode 138. Because the control input 28 and the positive voltage lead 24 are at approximately the same voltage level, the gate to source voltage of the switch 20 is insufficient to turn the switch 20 on.

Because the switch 20 is not turned on, there is no path between the negative supply input 18 and the positive voltage lead 24 through the positive supply input 16 through which a circuit may be completed. However, a circuit path may be available through the phase switches $120_1$, $120_2$ . . ., $120_N$ if the phase switches are MOSFETs. Such a path is available because of the inherent diodes in the MOSFETs. That circuit path, however, which starts through the inherent diodes in the phase switches 120, $120_2$ . . . $120_N$ and continues through the freewheeling diodes $122_1$, $122_2$ . . . , $122_N$, must propagate through the current limiting device 44 before continuing through the MOSFET 130 to the positive voltage lead 24. As discussed above, the current limiting device 44 limits the reverse polarity current to a relatively insignificant amount. Accordingly, at best, an insignificant amount of current can flow through any of the N coil circuits $116_1$, $116_2$, . . . , $116_N$ or the snubber circuit 114 of the motor control circuit 12.

It is noted that if the phase switches $120_1$, $120_2$, . . . $120_N$ are NPN bipolar junction transistors, the need for the current limiting device 44 is diminished because no current can flow in reverse polarity through the collector-emittor of a BJT. Moreover, in such a case, the need for the reverse polarity shut off circuit 21 may be eliminated because there is no path to provide the high voltage from the negative supply input 18 to the control input 28 to potentially turn the switch 20.

In any event, the embodiment of the protection circuit 10 according to the present invention described in FIG. 2 includes a first embodiment of the reverse polarity shut off circuit 21 that includes a MOSFET 130. However, it will be noted that alternative embodiments of the reverse bias shut off circuit 21 may be employed, including but not limited to the embodiment shown in FIG. 3 and discussed below.

FIG. 3 shows a power electronic circuit in the form of a motor control circuit 212 used in connection with a second embodiment of the protection circuit 10 of FIG. 1. The motor control circuit 212 is a control circuit for a brushless DC motor and includes a different exemplary snubber circuit commonly referred to as a C-Dump snubber 214. The C-Dump snubber 214 includes a snubber junction 224, a snubber switch 226, a catch coil 228, a snubber diode 230 and a snubber capacitor 232. The motor control circuit 212 includes N coil circuits $216_1$, $216_2$, . . . , $216_N$. Each of the N coil circuits $216_1$, $216_2$, . . . , $216_N$ correspond to one phase of an N phase motor, and may have a structure similar to the coil circuit $116_1$, discussed above in connection with FIG. 2. To this end, each coil $216_X$ in the exemplary embodiment discussed herein includes a stator coil $218_X$, a phase switch $220_X$, and a freewheeling diode $222_X$, as discussed above.

In the C-Dump snubber 214, the catch coil 228 is coupled between the positive supply input 16 and the snubber switch 226. The snubber switch 226 is further switchably connected to the snubber junction 224. In addition, the snubber capacitor 128 is coupled between the snubber junction 224 and the negative supply input 18. The snubber junction 126 is furthermore coupled to the snubber bias lead 22. The snubber diode 230 is coupled across the snubber switch 226 such that its cathode is coupled to the snubber junction 224.

The embodiment of the protection circuit 10 shown in FIG. 3 includes a second embodiment of the reverse polarity shut off circuit 221. The reverse polarity shut off circuit 221 includes an NPN bipolar junction transistor 234 having a base 236 coupled to the negative supply input 18 through a base resistor 242, a collector 238 coupled to the control input 28, and an emitter 240 coupled to the positive voltage lead 24. The base resistor 242 should have a resistance value that is similar to the resistance value of the current limiting resistor 44. In the protection circuit 10 of FIG. 3, the voltage clamp 36 is furthermore coupled between the base 236 and the collector 238 of the BJT 234.

In normal operation, a DC power source, not shown, is properly connected to the positive voltage lead 24 and the negative supply input 18. As an initial matter, the switch 20 is turned off. Upon connection of the DC power source however, current flows through the switch diode 34 to the positive supply input 16 of the motor control circuit 212. The current flowing through the positive supply input 16 provides sufficient bias power to allow the N coil circuits $216_1$, $216_2$, . . . , $216_N$ to operate in a manner as to start rotation of the motor's rotor, as discussed above in connection with FIG. 2.

As a result of such operation, the freewheeling diodes $221_1$, $222_2$, . . . , $222_N$ provide a current path to dissipate voltage buildup that occurs during the switching cycle, as discussed above. The C-Dump snubber 214, as is well known in the art, receives the current flow from the freewheeling diodes $221_1$, $222_2$, . . . , $222_N$, and generates a voltage level at the snubber junction 124 that exceeds the voltage on the positive supply input 16. This raised voltage level constitutes the bias voltage that is provided at the snubber bias lead 22.

As discussed above in connection with FIG. 2, the bias voltage propagates to the control input 28 from the snubber bias lead 22. The bias voltage eventually reaches a level sufficient to cause the control input 28 to turn "on" the switch 20. When the switch 20 is turned on, current flows directly from the first terminal 30 to the second terminal 32. As a result, energy from the DC voltage source is provided directly to the motor control circuit 112 without flowing through the switch diode 34. Moreover, current may also flow from the second terminal 32 to the first terminal 30, as discussed above.

The operation of the protection circuit 10 of FIG. 3 in the event that the DC power source is connected in reverse polarity will now be considered. In such circumstances, the voltage at the negative supply input 18 exceeds the voltage at the positive voltage lead 24 by the voltage level of the DC power source.

In general, the switch 20 does not turn on and remains in its "off" state. As a result, the switch 20 does not conduct current between the output 32 and the switched input 30. As discussed above in connection with FIG. 1, the switch 20 cannot turn on under such circumstances the reverse polarity shut off circuit 221 causes the switch 20 to be in the "off" state when it detects a relatively high voltage at the negative supply input 18.

To this end, the positive voltage on the negative supply input 18 propagates through the base register 242 to the base 236 of the BJT 234, and the negative (i.e. ground) voltage appears at the emitter 240. As a result, the base-emitter diode of the BJT 234 conducts current. Because the base-emitter diode conducts current, the BJT 234 turns on, thereby effectively coupling the control input 28 to the positive voltage lead 24. Because the control input 28 and the positive voltage lead 24 are effectively at the same voltage, the gate to source voltage of the switch 20 is insufficient to turn the switch 20 on. Because the switch 20 is not turned on, there is no path between the negative supply input 18 and the positive voltage lead 24 through the positive supply input 16 through which a circuit may be completed. However, as discussed above, a circuit path may be available through the phase switches $220_1, 220_2, \ldots, 220_N$. That path, however, as discussed above, can only be completed through the current limiting device 44. Another circuit path may be available through the snubber diode 230 and the catch coil 228. Such a circuit path can also only be completed through the current limiting device 44. As discussed above, the current limiting device 44 limits the reverse polarity current to a relatively insignificant amount. Accordingly, as above, only a insignificant amount of current can flow through any of the N coil circuits $216_1, 216_2, \ldots, 216_N$ or the C-Dump snubber 214 of the motor control circuit 212.

Thus, the above exemplary embodiments of FIGS. 2 and 3 show how the protection circuit may be used with two exemplary types of snubbers. It will be appreciated that the protection circuit 10 of the present invention may be readily adapted to power electronic circuits having other types of snubber circuits that generate a voltage in excess of the positive supply input. Moreover, it will be appreciated that the two embodiments of the reverse polarity shut off circuit shown in FIG. 2 or 3 are merely exemplary, and may be replaced by other circuits capable of controlling the switch 20 as described.

In general, it will be appreciated that the above described embodiments are merely exemplary, and that those of ordinary skill in the art may readily devise their own implementations that incorporate the principles of the present invention and fall within the spirit and scope thereof.

I claim:

1. A protection circuit for use in a power electronic circuit having a positive supply input, a negative supply input, and a snubber, the protection circuit comprising:
   a snubber bias lead adapted to be coupled to obtain a bias voltage from the snubber of the power electronic circuit;
   a positive voltage lead adapted to be coupled to a positive voltage lead of a power supply;
   a positive supply lead adapted to be coupled to the positive supply input of the power electronic circuit;
   a switch having a control input coupled to the snubber bias lead, a first terminal coupled to the positive voltage lead, and a second terminal coupled to the positive supply lead, the switch operable to selectively allow current flow from the second terminal to the first terminal based at least in part on the bias voltage at said control input; and
   a reverse bias shut off circuit coupled to the negative supply input and the control input, the reverse bias shut off circuit operable cause the switch to inhibit current flow from the second terminal to the first terminal when a positive supply voltage is detected at the negative supply input.

2. The protection circuit of claim 1 further comprising a current limiting device coupled between the snubber bias lead and the control input.

3. The protection circuit of claim 2 wherein the current limiting device has DC impedance value that is at least an order of magnitude greater than a DC impedance of the power electronic circuit between the positive supply input and the negative supply input.

4. The protection circuit of claim 1 further comprising a diode coupled to conduct in forward bias from the first terminal to the second terminal.

5. The protection circuit of claim 1 further comprising a voltage clamp coupled between the control input and the negative supply input.

6. The protection circuit of claim 5 wherein the voltage clamp includes a diode series connected with a zener diode.

7. The protection circuit of claim 1 further comprising a charge storage device coupled between the snubber bias lead and the negative supply input.

8. The protection circuit of claim 7 wherein the charge storage device comprises a capacitor.

9. The protection circuit of claim 1 further comprising a voltage clamp coupled between the positive voltage lead and the control input.

10. The protection circuit of claim 1 wherein the reverse bias shut off circuit comprises a shut off MOSFET having a source coupled to the positive voltage lead, a drain coupled to the control input of the switch, and a gate coupled to the negative supply input.

11. The protection circuit of claim 10 wherein the reverse bias shut off circuit further comprises a diode coupled reverse bias from the control input of the switch to the drain of the shut off MOSFET.

12. The protection circuit of claim 1 wherein the reverse bias shut off circuit comprises a shut off bipolar junction transistor having a base connected to the negative supply input, a first BJT terminal coupled to the control input, and a second BJT terminal coupled to the positive voltage lead.

13. The protection circuit of claim 12 further comprising a voltage clamp coupled between the first BJT terminal and the base.

14. An arrangement for providing protection to a motor circuit having a snubber, the arrangement comprising:
   a positive supply input of said motor circuit;
   a negative supply input of said motor circuit;
   a snubber bias lead coupled to the snubber; and
   a MOSFET transistor comprising a gate, a drain and a source, the drain coupled to a positive voltage lead of a power supply, the source coupled to the positive supply input of the motor circuit; and wherein the gate is connected to the snubber bias lead.

15. The arrangement of claim 14 further comprising a diode coupled to conduct in forward bias direction from the drain to the source.

16. The arrangement of claim 15 wherein the diode comprises a portion of said MOSFET transistor.

17. The arrangement of claim 14 further comprising a current limiting device coupled between the snubber bias lead and the gate.

18. The arrangement of claim 14 further comprising a voltage clamp coupled between the gate and the negative supply input.

19. The arrangement of claim 16 wherein the voltage clamp includes a diode series connected to a zener diode.

20. The arrangement of claim 14 further comprising a capacitor coupled between the gate and the negative supply input.

21. The arrangement of claim 17 wherein the current limiting device further comprises a resistor.

22. The arrangement of claim 14 wherein the MOSFET further comprises a first MOSFET, and wherein the arrangement further comprises a second MOSFET having a source coupled to the positive voltage lead, a drain coupled to the gate of the first MOSFET, and a gate coupled to a negative supply input of the motor circuit.

23. A method of providing protection to a power electronic circuit, the power electronic circuit having a positive supply input, a negative supply input, and a snubber, the method comprising:
   a) generating a snubber voltage at the snubber of the power electronic circuit, and b) providing the snubber voltage to the control input of a switch, the switch further including a first terminal coupled to a positive voltage supply and a second terminal coupled to the positive supply input, the switch operable to selectively allow current flow from the second terminal to the first terminal based on the bias voltage at said control input, and to selectively inhibit current flow from the second terminal to the first terminal.

24. The method of claim 23 further comprising the step of, prior to step a), providing a startup current from the positive voltage supply through the first terminal and the second terminal to the power supply input of the power electronic circuit.

25. The method of claim 23 further comprising:
c) periodically storing charge from the snubber voltage in a capacitor coupled to the control input.

26. A motor control circuit comprising:
a positive supply input;
a negative supply input adapted to be coupled to a negative voltage lead of a power supply;
at least one coil circuit coupled between the positive supply input and the negative supply input, the at least one coil circuit including a diode coupled to a snubber lead;
a snubber including a capacitor coupled between the snubber lead and the negative supply input and an impedance coupled between the snubber lead and the positive supply input; and
a MOSFET transistor comprising a gate, a drain and a source, the drain adapted to be coupled to a positive voltage lead of the power supply, the source coupled to the positive supply input of the motor circuit, and the gate coupled to the snubber lead.

27. The motor control circuit of claim 26 wherein the at least one coil circuit comprises a plurality of coil circuits.

28. The motor control circuit of claim 26 wherein the at least one coil circuit comprises a coil and a transistor switch, the transistor switch having a first power lead coupled to the coil and a second power lead coupled to the negative supply input, the coil further coupled to the power supply input, and wherein the diode is coupled between the first power lead and the snubber lead.

29. The motor control circuit of claim 26 wherein the impedance includes a resistor.

30. The motor control circuit of claim 26 wherein the impedance includes a catch coil.

31. The motor control circuit of claim 26 further comprising a reverse bias shut off circuit coupled to the negative supply input and the control input, the reverse bias shut off circuit operable cause the switch to inhibit current flow from the output to the switched input when a positive supply voltage is detected to the negative supply input.

\* \* \* \* \*